Figure 1:
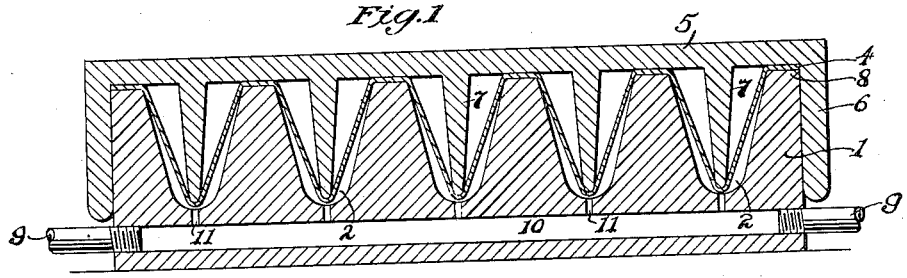

July 9, 1935.　　　　R. W. SAMPSON　　　　2,007,548
METHOD AND MEANS FOR FORMING HOLLOW ARTICLES
OUT OF SHEET RUBBER OR THE LIKE
Filed Jan. 4, 1934　　2 Sheets-Sheet 1

Inventor:
Robert W. Sampson.
by Andrew Gibson,
his Attorney.

July 9, 1935.                R. W. SAMPSON                2,007,548
        METHOD AND MEANS FOR FORMING HOLLOW ARTICLES
                OUT OF SHEET RUBBER OR THE LIKE
                    Filed Jan. 4, 1934        2 Sheets-Sheet 2
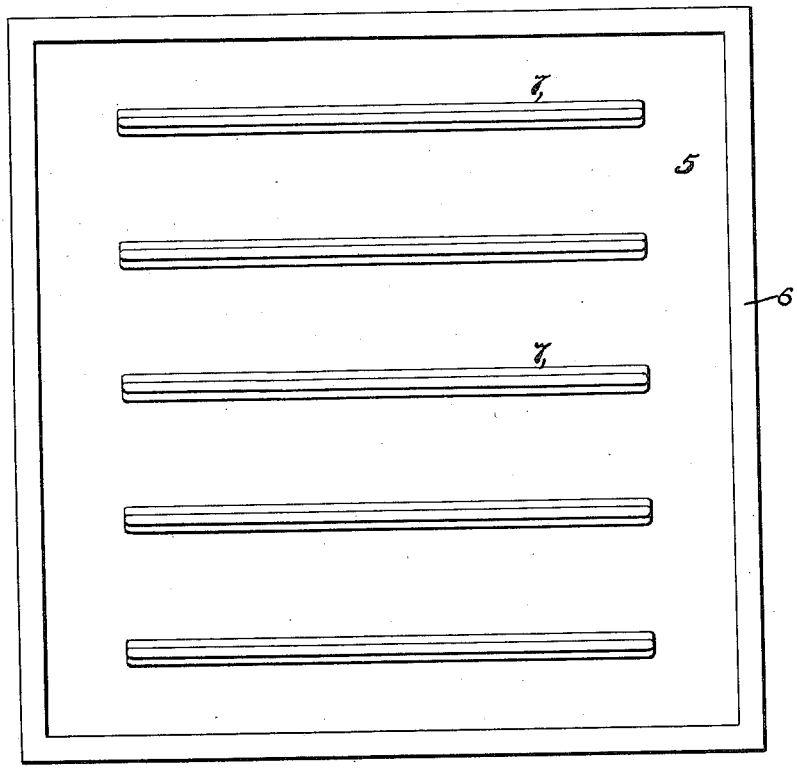
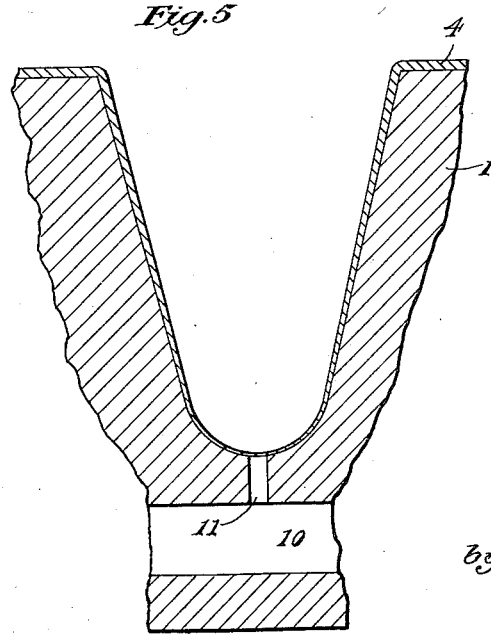
Inventor:
Robert W. Sampson.
by
his Attorney.

Patented July 9, 1935

2,007,548

UNITED STATES PATENT OFFICE 2,007,548

METHOD AND MEANS FOR FORMING HOLLOW ARTICLES OUT OF SHEET RUBBER OR THE LIKE

Robert W. Sampson, New York, N. Y., assignor to Charles J. Hardy, New York, N. Y.

Application January 4, 1934, Serial No. 705,188

12 Claims. (Cl. 18—35)

My invention relates to the formation of hollow articles from rubber or the like, by what is known as the vacuum process, wherein a sheet of uncured rubber is spread over a mould or form having a cavity therein, and, by exhausting the air from the cavity, is sucked down thereinto and caused to lie against the wall of the cavity, assuming a desired shape which may be fixed by vulcanization.

In this process, when the rubber sheet is spread over the mould and suction is applied, the portion of the sheet above the cavity will stretch down into it, while the surrounding parts of the sheet will remain or be held practically fixed so that it will not slip or be drawn down into the mould. This results in stretching the portion of sheet which is extended down into the cavity so that it becomes thinner than it was originally, and thinner than the unstretched portions remaining outside of the cavity; and, where the cavity is not too deep in proportion to its width, this thinning down of the sheet may be approximately compensated for by making the sheet sufficiently thick so that the lining of the cavity will not be unduly thin.

However, in practice, this lining of the cavity will not be of a uniform thickness; because as the sheet is stretched down into the cavity its portions nearest the edge of the cavity will come first into contact with the cavity's walls, and will be held there by the atmospheric pressure, thus checking the further stretching of that part of the sheet; and this action will continue, as the sheet descends into the cavity, so that it will become progressively thinner and thinner as it approaches the bottom of the cavity; and, if the cavity is deep, the lining of the bottom may become so thin as to be worthless for practical purposes, although the material drawn down into the cavity may be quite sufficient to provide a lining of adequate thickness if evenly stretched.

Objects of my invention are to overcome this uneven stretching of the sheet and to cause it to stretch substantially evenly and uniformly and to form a lining of approximately even thickness in the cavity of the mould; to provide for local, relative thickening of the lining, if desired; to accomplish such results by stretching the sheet, or selected parts thereof, down into the cavity at an even tension and thickness before it is brought into contact with the cavity's wall by the use of the vacuum; to do this in a simple manner by the use of positive mechanical means; and to obtain the other desirable results hereinafter pointed out.

Figure 2:
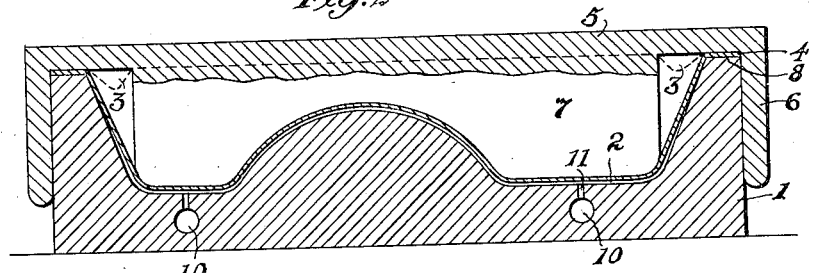
Figure 3:
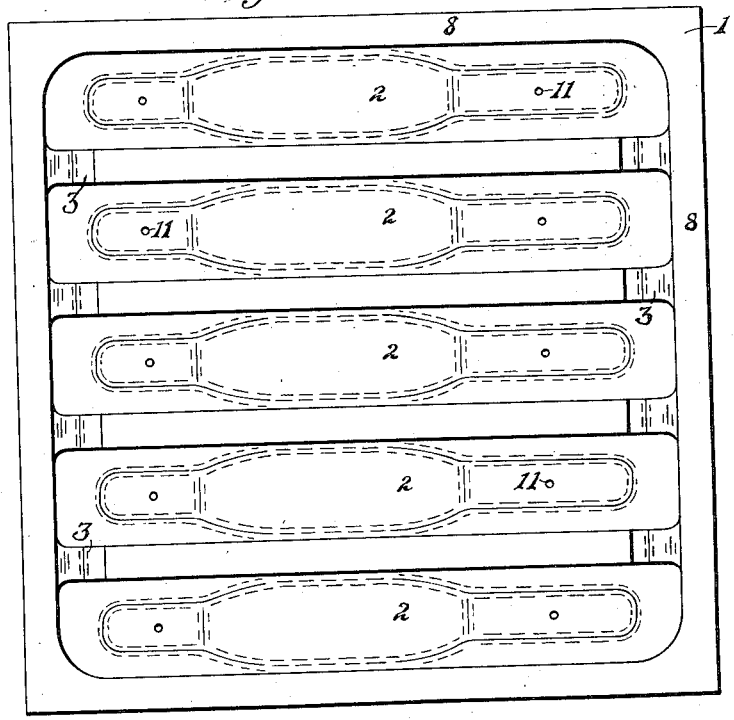

In the drawings, Fig. 1 is a cross sectional view of a mould and a sheet stretching means; Fig. 2 is a sectional view of the same taken at right angles to Fig. 1; Fig. 3 is a plan view of the mould; Fig. 4 is a bottom view of the stretcher; and Fig. 5 is a detail, on an enlarged scale, illustrating the disadvantage of the old method.

The mould 1 is shown as containing a number of cavities, 2, 2, with intercommunicating channels 3, 3, adapted to form, for instance, the bottom of a hollow, sheet rubber cushion. But, in practice, the form of the mould, will be adapted to the article to be made. Those familiar with the art understand that, after the two parts of the hollow article have been moulded, they are put together and vulcanized to make the completed article.

Over this mould 1 is spread a sheet 4 of uncured rubber composition, or the like, having sufficient material therein to be stretched to cover the interior of the mould.

A stretcher 5, is provided with a rim 6, adapted to fit around the mould, and with ribs 7, 7, adapted to extend down into the cavities 2, 2 of the mould, but, ordinarily, not to come in contact with the walls of the cavity. The edges of these ribs are so formed, as by rounding, that they will not cut or rupture the sheet, and they may be of a greater or less width, as desired, to engage more or less of the sheet 4.

The stretcher 4, is then pressed down over the mould, as shown in Figs. 1 and 2, its ribs 7, 7, stretching the sheet 4 down into the cavities 2, 2, but not so as to bring it into contact with the walls of the cavities. This will result in the material of the sheet being evenly stretched between the upper edges of the mould and the bottoms of the ribs. The edges of the sheet, where they lie over the edges 8, 8, of the mould, may be held by temporary cement, or a special vacuum groove (not shown) so that it will not be drawn into the center of the mould.

A partial vacuum is then created within the cavities of the mould and below the sheet 4, by any suitable means, as by a vacuum pump, not shown, connected with the pipes 9, 9, leading out of the channels 10, 10, and from which other channels 11, 11, open into the cavities 2, 2, of the mould.

This causes the sheet 4 to be drawn against the sides and bottom of the mould quite evenly, because of its preliminary stretching. And, after this step has been completed, the stretcher may be removed and the formation of the hollow article proceeded with in accordance with well known methods now in use.

The portions of the sheet 4 in direct contact with the edges of the ribs 7, 7, will not stretch so much, preliminarily, as the portions between those edges and the upper edges of the mould. And this may be taken advantage of to produce thicker portions in the moulded sheet toward the bottoms of the cavities if that is desired; and the areas of the thickened portion may be varied by varying the width of the edges of the ribs.

Furthermore, if it is desirable to vary the thickness of the moulded sheet at other points than at the bottom, the stretcher ribs may be so formed, as by extensions, to contact the sheet at such points and thereby restrict its stretching locally, in a similar way to that described as taking place at the lower edges of the ribs.

Obviously the form of the stretcher ribs may be modified to suit the form of a selected mould cavity, and to stretch the rubber sheet thereinto without bringing it into contact with the walls of the cavity at undesirable points. Thus, if half of a hollow, globular ball were to be formed, a single stem pressing down on the sheet centrally above the cavity would accomplish the desired results. And other modifications of form would be obvious to the practical mechanic.

The form of mould and stretcher illustrated and described is, therefore, to be regarded as typical only. For, obviously, details may be modified as above suggested, and as by the use of mechanical equivalents, without departing from the spirit of my invention and the scope of the claims.

Reference to Fig. 5 will emphasize the disadvantage of the old method, which my improvement overcomes. For it illustrates how the rubber sheet 4, when drawn down into the cavity by vacuum only, will become thinner and thinner, due to its progressive contact with the cavity's walls, until at the bottom it may become so thin as not to be of practical or commercial use.

For simplicity, in the claims, I speak of using a sheet of rubber; but I wish it to be understood that in that term I include compositions containing rubber, or rubber substitutes having qualities of plasticity, elasticity and/or curability similar to rubber.

Having thus described my invention what I claim and desire to secure by Letters Patent of the United States is:—

1. The method of forming hollow rubber articles from a sheet of uncured rubber, consisting in holding the sheet free of other contacts within delimited lines, applying pressure only to a comparatively small area of the sheet within said lines and thereby stretching the sheet in substantially uniform thickness in straight lines between the holding lines and the initial pressure area, and then applying pressure generally to the stretched sheet.

2. The method of forming hollow rubber articles from a sheet of uncured rubber, consisting in holding the sheet free of other contacts within delimited lines, applying pressure only to a comparatively small area of the sheet within said lines and thereby stretching the sheet in substantially uniform thickness in straight lines and free of lateral contacts between the holding lines and the initial pressure area, and then applying pressure generally to the stretched sheet.

3. The method of forming hollow rubber articles from a sheet of uncured rubber, consisting in holding the sheet free of other contacts within delimited lines, applying pressure only to a comparatively small area of the sheet within said lines and thereby stretching the sheet to substantially the depth of the article to be formed in substantially uniform thickness in straight lines between the holding lines and the initial pressure area, and then applying pressure generally to the stretched sheet.

4. The method of forming hollow rubber articles from a sheet of uncured rubber, consisting in holding the sheet free of other contacts within the marginal limits of a hollow mould, to approximately the depth of the mould, applying pressure only to a comparatively small area of the sheet within said limits and thereby stretching the sheet to approximately the depth of the mould in substantially uniform thickness in straight lines between the said marginal limits and the initial pressure area, and then applying pressure generally to the stretched sheet.

5. The method of forming hollow rubber articles from a sheet of uncured rubber, consisting in holding a plurality of portions of the sheet free of contacts within severally delimited areas applying pressure only to a comparatively small portion of the sheet within each of said areas, and thereby stretching the sheet within each of said areas in substantially uniform thickness and in straight lines, free of materially increased lateral contacts, to approximately the extent desired in the hollow article, and then applying pressure generally to each delimited area to bring the stretched sheet into the desired formation.

6. The method of forming hollow rubber articles from a sheet of uncured rubber, consisting in holding a plurality of portions of the sheet free of contacts within severally delimited areas, applying pressure only to a comparatively small portion of the sheet within each of said areas, and thereby stretching the sheet within each of said areas in substantially uniform thickness and in straight lines, free of materially increased lateral contacts, to approximately the extent desired in the hollow article, and then applying elastic pressure generally to each delimited area to bring the straight lined portions of the stretched sheet out of their planes and into the desired formation.

7. The combination, with a mould, provided with an open mouthed chamber therein of stretching means for locally engaging a restricted portion of a sheet of rubber held free between the edge of the chamber and the engaging means and stretching it down into and free of the walls of the chamber, without substantially increasing the contact of the sheet with the stretching means, and means for withdrawing air from the chamber below the sheet.

8. The combination, with a mould, provided with an open mouthed chamber therein of a cooperating stretcher embodying a restricted terminal constituting means for locally stretching a sheet of rubber held free between the edge of the chamber and said terminal down into but free of the walls of the chamber or body of the stretcher, and means for withdrawing air from the chamber below the sheet.

9. The combination, with a mould provided with an open mouthed chamber therein of a cooperating stretcher embodying a member adapted to extend freely downward constituting means for locally stretching a sheet of rubber held free between two points down into but free of the walls of the chamber and without materially increasing the contact of the stretcher with the sheet, and means for withdrawing air from the chamber below the sheet.

10. The combination, with a mould provided with a plurality of open mouthed chambers therein of a plurality of stretchers having restricted terminals adapted to severally extend down into said chambers out of contact with their walls, leaving unobstructed lines between the terminals and the lips of the chambers, and means for withdrawing air from said chambers.

11. The combination, with a mould, provided with a plurality of open mouthed chambers therein, of a plurality of stretchers, each having restricted terminals, carried by common means and adapted to severally extend down into said chambers out of contact with their walls, the bodies of said stretchers at all times remaining within straight lines extending from the terminals to the lips of the chambers, and means for withdrawing air from said chambers.

12. The combination, with a mould provided with an open mouthed chamber therein, of a cooperating stretcher substantially narrower, than and disposable centrally of the chamber, whereby a sheet of rubber may be stretched substantially to the bottom of and free of the sides of the chamber and the stretcher.

ROBERT W. SAMPSON.